Feb. 15, 1938.  W. F. EPPENSTEINER  2,108,034
APPARATUS FOR SWEATING OUT FUSIBLE METALS
Filed April 30, 1934   2 Sheets-Sheet 1
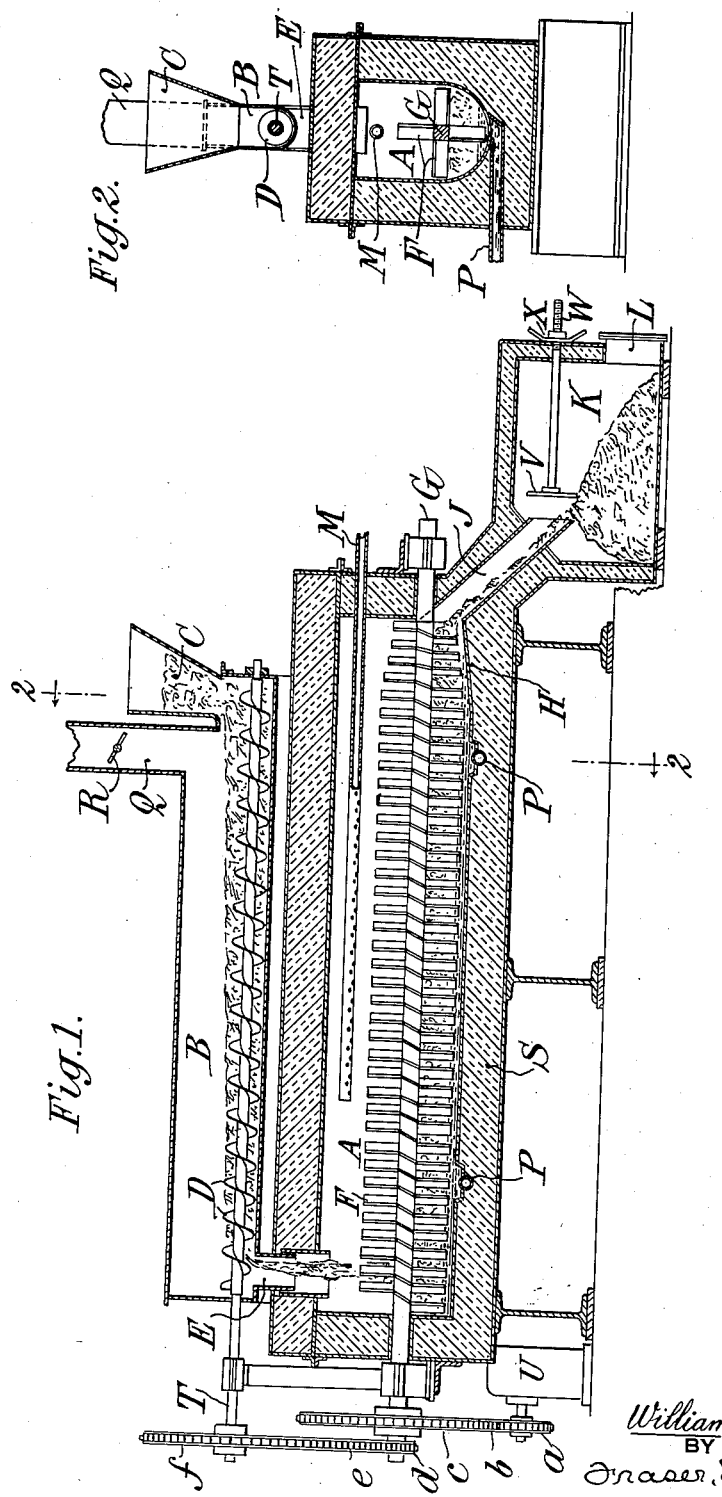
INVENTOR
William F. Eppensteiner,
BY
Fraser, Myers & Manley,
ATTORNEYS.

Feb. 15, 1938.  W. F. EPPENSTEINER  2,108,034
APPARATUS FOR SWEATING OUT FUSIBLE METALS
Filed April 30, 1934   2 Sheets-Sheet 2
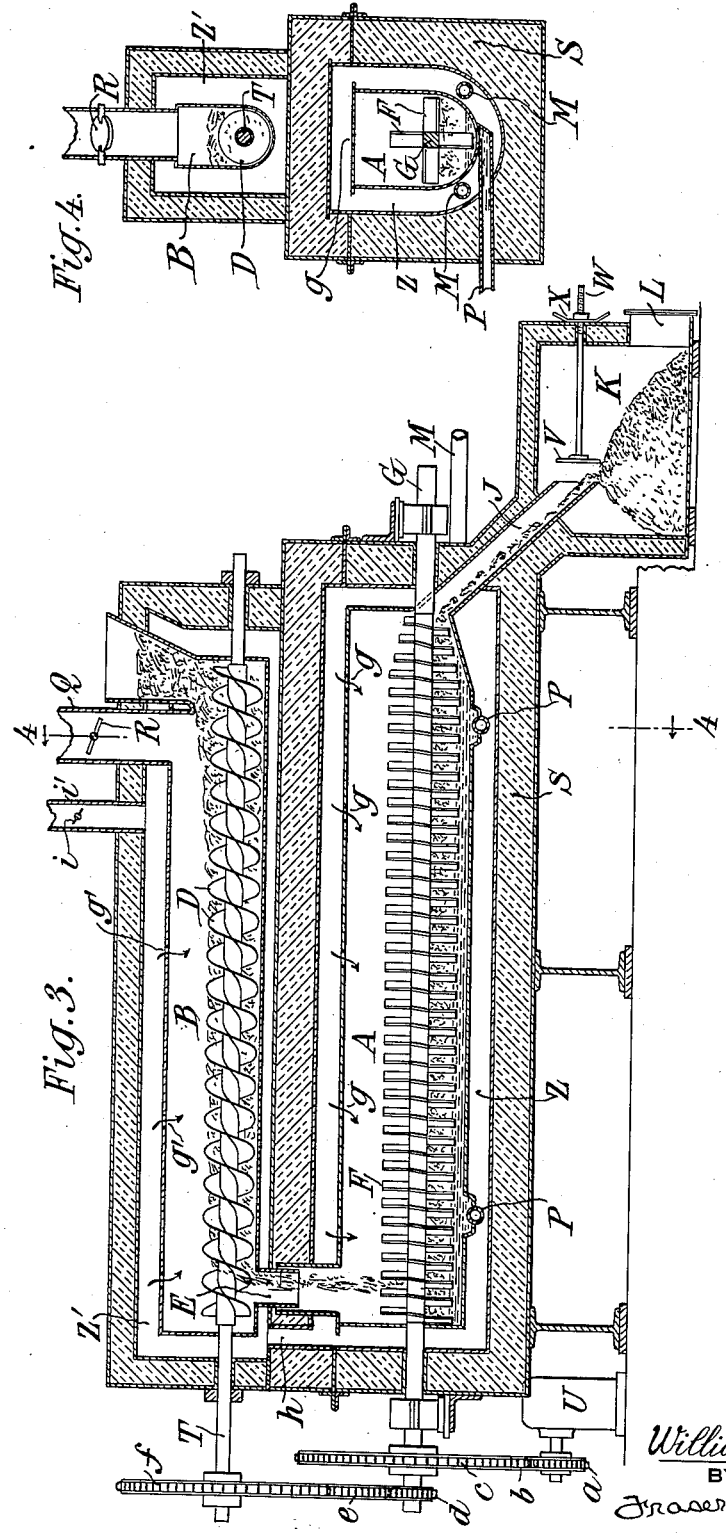
INVENTOR
William F. Eppensteiner,
BY
Fraser, Myers & Manley
ATTORNEYS.

Patented Feb. 15, 1938

2,108,034

UNITED STATES PATENT OFFICE 2,108,034

APPARATUS FOR SWEATING OUT FUSIBLE METALS

William F. Eppensteiner, Rahway, N. J., assignor to The American Metal Company, Limited, New York, N. Y., a corporation of New York Application April 30, 1934, Serial No. 723,082

17 Claims. (Cl. 75—63)

This invention relates to apparatus, technically called a "liquator", for separating readily fusible metals or other materials from less fusible metals or materials with which they are associated. Such apparatus are commonly used for melting solder from scrap or fragments of metals, or for recovering solder from dross resulting from a previously applied melting-out or sweating process, and are generally applicable to the separation of any readily fusible metal or substance from infusible or less fusible materials with which the same may be associated, either in the natural state or as the result of any manufacturing or refining operations.

In my application Serial No. 683,657, filed August 4, 1933, I have set forth and claimed a method for accomplishing such separation by exposing the materials in a closed chamber to the action of superheated steam, the temperature of the steam being higher than the fusion point of the metal or substance to be separated. In that application I have, for illustrating the method, shown a simple apparatus comprising an elongated chamber or retort into which the material for treatment is introduced at one end and from which it is withdrawn as the opposite end, being transferred from one end to the other in any suitable manner. Superheated steam is introduced through perforated pipes or otherwise into such chamber into direct contact with the material under treatment, which is supported on any suitable open or foraminous grate through which the solder or other material as melted off may fall or trickle into a bath beneath, from which it may be removed at intervals as by tapping it off into molds.

The present invention provides a suitable apparatus for the practice of this method. It also makes provision for the treatment by liquation of fine material, such for example, as material existing in grains or particles of ⅛ inch diameter or less. Such material requires constant stirring, in order to expose all portions of the mass to the action of the superheated steam and to disengage the fused material from its adherence to the unfused particles. Material in this state of sub-division also is frequently damp and it is desirable to be able to introduce it into the liquating apparatus without subjecting it to a preliminary drying; and this the present invention provides for.

The apparatus forming the preferred embodiment of the present invention comprises an elongated sweating chamber above which is a feeding chamber; a hopper admits the material to be treated into the upper chamber wherein it is fed by any suitable means, such as a conveyor, and discharged into a vertical outlet through which it falls into one end of the sweating chamber; in this chamber the material is continually stirred by blades or puggers which agitate the material and propel it continually toward the opposite end of the chamber. Near such opposite end, at which is the outlet from the chamber, the bottom of the chamber is formed as a rising incline constituting an up-grade leading to the outlet. In this chamber the fusion takes place, and the fused material falls to the bottom and flows to one or more wells or depressions from which it may be tapped out through lateral outlet pipes or passages and cast in molds exterior to the apparatus. The superheated steam is introduced into the sweating chamber, being taken from any suitable boiler and superheater, and admitted through a pipe entering the chamber and preferably distributed through perforations in such pipe to different portions of the sweating chamber. The superheated steam, after acting upon the material which is subjected to stirring within this chamber and flowing to the opposite end thereof, passes out through an outlet passage which is preferably the same as the one through which the material is dropped or introduced into the sweating chamber, so that the material is acted upon by the superheated steam in falling through such passage. The material is heated and dried in the heating chamber by the circulation therethrough of the superheated steam flowing from the sweating chamber on its way to a stack by which it is discharged. The hot steam thus flows into intimate contact with the material to be treated, so that if the same shall contain moisture, it may dry this out, the moisture therefrom being taken up by the superheated steam and carried out through the stack. The residual material or dross in the sweating chamber, after it has been freed from the adhering solder or other fusible substance, is pushed up the incline to the outlet and falls out through the latter down a descending passage or chute into a dross or refuse chamber or pit which is normally closed to guard against admitting outside air, but which is provided with a clean-out door through which the residual material may be pulled or raked out from time to time. The outlet entering this chamber is provided with a closure whereby it may be shut off to prevent admission of air to the sweating chamber when the clean-out door is opened.

In another or modified construction, the sweating chamber and also, if desired, the feeding chamber, are surrounded by steam jackets into which the superheated steam is first admitted and from which the steam passes into the sweating chamber to circulate therein and therefrom in the manner already described.

In the accompanying drawings—

Figure 1 is a longitudinal mid-section, and Fig. 2 is a transverse section on the line 2—2 of one embodiment of the invention;

Fig. 3 is a similar longitudinal mid-section, and Fig. 4 a transverse section on the line 4—4, of the other embodiment.

In the drawings A is the elongated sweating or liquating chamber, B the feeding chamber, C the hopper for feeding material thereinto, D a conveyor for feeding the material through the feeding chamber, and E the outlet from this chamber into the sweating chamber A. The sweating chamber is provided with a pugger F, consisting of inclined blades mounted on a rotary shaft G. The sweating chamber is preferably cylindrical in its lower part, the pugger turning concentrically therein and by the screw action of its stirring arms or blades serving not only to agitate, but also to continually feed the material from the entering to the emerging or outlet end of the chamber. Approaching the outlet end, the bottom of the chamber is formed with an inclined plane or up-grade H serving as a dam to hold back the solder or other substance which is fused out from the material under treatment, while the latter is propelled up this incline by the pugger and is finally discharged through an outlet chute J into a dross pit or refuse chamber K. This chamber has an outlet opening or clean-out door L through which the accumulating material may be removed.

Superheated steam from any suitable boiler and superheater is introduced into the chamber A by means of a steam pipe M which is perforated within the chamber to distribute the steam. The steam thus circulates througout the chamber, acting to heat the material and fuse out the fusible substance, which latter accumulates in the bottom of the chamber, which may have a receiving trough or the curved bottom of the chamber may serve as such trough. At any suitable point or points one or more wells or depressions are formed into which the fused substance, such as solder, may flow as it accumulates and from time to time it may be drawn off through a lateral pipe or passage P, the outlet of which is controlled in any suitable way whereby the solder or other substance may be tapped off and run into molds or other receivers from time to time.

From the top of the feed chamber B, and preferably remote from the outlet passage E and adjacent the hopper C, there rises a stack Q for the outflow of the steam, and this stack may conveniently be constricted more or less by turning a damper R within it to keep the superheated steam in the chamber under more or less of a slight pressure, sufficient to prevent the inleaking of air in the event that any of the joints in the apparatus should not be sufficiently tight.

The chamber A is closed by a non-conducting jacket S preferably constructed with an outer shell and a filling of heat-insulating material between this shell and the inner shell or casing of the chamber A and extending over the top thereof, as indicated in the drawings. The shaft G passes out at—opposite ends through the jacket.

The conveyor D,—shown as an endless screw conveyor mounted on the shaft T, as usual,—passes out through the end of the chamber.

The shafts G and T are driven by an electromotor U or other source of power through chain and sprocket gearing or in any other suitable manner. As shown, the motor shaft drives through a sprocket $a$, chain $b$, and sprocket $c$ on the shaft G; this shaft carries a sprocket $d$ which drives a chain $e$ and sprocket $f$ on the shaft T. Any suitable gear reduction may be applied between the motor and the pugger shaft and between the latter and the conveyor shaft. The reductions shown, by way of example, are 1:3.5 and 1:6, respectively, so that the conveyor is driven at one-sixth the speed of the pugger; but these proportions may be varied according to the material to be treated.

In operation the material for treatment is introduced in the hopper C and in sufficient quantity to keep the lower part of the hopper closed and sealed, and preferably so as to cover or bury the conveyor D. This conveyor gradually transfers the material through the feed chamber and finally drops it out through the outlet E. In its passage through this chamber the material is dried by the superheated steam which carries considerable residual heat from the sweating chamber. The dry material dropping into the sweating chamber at one end thereof is continually stirred and propelled through this chamber by the stirrer arms of the pugger, and is finally discharged through the chute J into the pit K. In its passage through the sweating chamber the fusible substance is fused out and by the continued stirring is disengaged from the residue and falls into the receiving drain constituted by the lower part of the chamber from which at intervals it is tapped out through the pipes P for casting or other handling. From time to time the residual material or dross in the pit K has to be removed, and for this purpose it is important to close the outlet J, for which purpose a cover, door or valve V is provided mounted on a screw-steam W and propelled by a turning of the nut X to move the same endwise and press the door or valve V tight against the outlet end of the chute. This done, the clean-out door may be opened and the accumulated dross or residue may be raked or pulled out from the pit.

The device provided by this invention is especially adapted for acting upon drosses which are produced during the sweating out of solder or the like from such articles as automobile radiators. These drosses, when heated above the melting point of solder, apparently comprise a mass of small droplets of solder, each covered by a tough coating which may be composed of some oxide, which coating encloses the molten drop. One effect of the pugger blades in entering and passing through the body of this material is apparently to break up such outside coatings so that the molten solder can escape. The bottom of the chamber B and the inclined plane H together form a shallow well or basin in which the solder collects to form a bath. This bath substantially floats the mass of dross above it, and the pugger blades preferably are of such length as to pass through the mass of dross and into the path, which in turn quite apparently facilitates the breaking up of the dross particles, the removal of the coating, and the release of the solder. The pugger blades are preferably close together so that the material is very thoroughly rubbed, either by the blades or particle upon particle, in order to release the maximum quantity of solder contained in the dross. The forward inclination of the blades is such as to move the material slowly to the discharge point, which effect is modified by the bridge or inclined plane H.

In Figs. 3 and 4 the apparatus is of the same construction, except that between the chamber A and the insulating jacket S a steam jacket Z is formed between two shells of metal, as clearly shown. The steam pipe M (two being shown), instead of entering directly into the chamber A, enters into this jacket Z and discharges the steam thereinto, so that the steam circulates through and around this jacket, thereby externally heating the walls of the chamber A before entering the latter. Any suitable openings or perforations are provided, suitably located as at $g, g$, for admitting the steam from the jacket into the chamber A. From the chamber A the steam passes out through the communicating passage E, as before described, into the chamber B. This feed chamber is also steam-jacketed, if desired, this steam jacket being marked Z'. The steam may pass from the jacket Z to the jacket Z' through a special conduit $h$ (Fig. 3) or in any other manner, it being sufficient to provide a loose fit around the outlet pipe E descending from the feed chamber and between this and the continuing pipe for forming an inlet to the sweating chamber. The steam from the jacket Z' may be admitted through perforations $g'$, located wherever desired, into the feed chamber B. It is desirable to provide also an exhaust stack $i$ for the final escape of the steam from the jacket Z', and this may have a damper $i'$. In all other respects the construction is the same as that first described.

It is desirable to make the feed chamber B an elongated chamber in order to provide sufficient time for the transit of the material from the inlet to the outlet whereby it may become thoroughly dry, if it needs drying. For use with materials which do not require drying, the chamber B may be greatly shortened.

It will be understood that the construction may be considerably varied within the scope of my invention as defined in the subjoined claims. The precise construction in any given instance will depend somewhat upon the nature of the materials to be acted upon and the temperatures to be maintained. The superheated steam should be introduced at a temperature suitable to the materials under treatment, being at any temperature sufficiently above the fusion point of the more fusible metal or material to insure its fusion and sufficiently below that temperature at which the more refractory or less fusible material would be fused or injured by heat. For treating dross and various scrap containing solder or lead, temperatures ranging from 750° to 900° F. are suitable.

I claim as my invention:

1. Apparatus for separating a more fusible from a less fusible material by means of superheated steam, comprising a stationary elongated sweating chamber having a normally closed bottom portion adapted to support comminuted material, a source of steam supply, a steam inlet to said chamber, means for feeding the material to be treated into one end thereof, stirring means therein for agitating and propelling the material, and an outlet for discharging the residual material from the opposite end thereof, with means for discharging the fused-out substance accumulating in the bottom of the chamber.

2. Apparatus according to claim 1, the stirring means being a pugger having oblique arms projecting from a central rotating shaft.

3. Apparatus according to claim 1, the sweating chamber having the bottom formed as a rising inclined plane toward its outlet end to serve as a dam for holding back the fused-out substance.

4. Apparatus comprising a stationary elongated sweating chamber, a source of steam supply, a steam inlet to said chamber, and a feed chamber above it with a communicating passage between said chambers, a hopper admitting material to the feed chamber, a conveyor propelling the material from the hopper to said communicating passage through which the material is admitted into the sweating chamber, and a discharge stack for spent steam from the feed chamber remote from said communicating passage, whereby the steam circulates through the feed chamber for drying the material being fed therein.

5. Apparatus according to claim 1 with an outlet stack for spent steam and an adjustable obstruction therein for putting the escaping steam under variable pressure.

6. Apparatus according to claim 1 with a dross pit receiving the material discharged through said outlet, a clean-out door for said pit, and a cover therein for closing the outlet thereto from the sweating chamber, whereby to isolate said pit from the sweating chamber during the removal therefrom of the accumulated residue.

7. Apparatus according to claim 4 with steam jackets surrounding the sweating chamber and feed chamber, and communicating means for admitting superheated steam from the sweating chamber jacket to the feed chamber jacket.

8. An apparatus for separating more fusible from less fusible material in dross, comprising a substantially closed chamber into which such dross is introduced, a well in said chamber adapted to receive and accumulate fused-out material, means for heating the dross in said chamber to the fusing point of the more fusible material and mechanical means adapted to pass substantially into a mass of dross and to release, by contact, the coatings of fused material from the unfused material, whereby to permit the fused material to accumulate in said well.

9. The method of recovering more fusible from less fusible metals in dross, which consists in heating the dross to the fusion point of the more fusible metal, passing a mechanical device downwardly substantially into the dross to break the adhesion between the unfused and fused material whereby to release the latter and to cause a downward movement thereof, said released metal being permitted to accumulate sufficiently to form a bath upon which the body of dross may float, whereby the released metal, urged downwardly by said mechanical action, may unite with and be retained with the said bath.

10. Apparatus for separating a more fusible from a less fusible material, comprising a sweating chamber, an inlet for introducing thereinto material to be treated, an outlet at a point removed from said inlet for discharging residual unfused material from said chamber, means for agitating and propelling material being treated from said inlet to said outlet, a steam jacket substantially surrounding said chamber and having an inlet for introducing steam thereinto for assisting in heating the said chamber, one or more apertures establishing communication between the jacket and chamber adapted to pass steam from the former into the latter for directly heating and fusing the more fusible portions of the material being treated, and a separate outlet for discharging the fused-out substance from said chamber.

11. Apparatus for separating a more fusible from a less fusible material, comprising an elongated sweating chamber, a drying chamber above said sweating chamber, a communicating passage between said chambers, means for propelling material to be treated through said chambers, outlets for separately discharging residual material and fused-out substances from the sweating chamber, a steam jacket substantially surrounding both of said chambers, an inlet for introducing steam into said jacket for assisting in heating the said chambers, and one or more apertures establishing communication between the jacket and each of said chambers and being adapted to pass steam from the jacket into said chambers.

12. Apparatus for separating more fusible from less fusible material in dross, comprising a substantially closed chamber into which such dross is introduced, means for heating the dross in said chamber to the fusing point of the more fusible material, a well in said chamber adapted to receive and accumulate a bath of fused-out material and a rotatable element, movable through the dross and into such bath, and adapted to wipe fused material from particles of unfused material and to assist such fused material into a union with the bath.

13. The method of recovering more fusible from less fusible metals in dross which consists of placing the dross within an enclosure to protect it from the atmosphere and minimize oxidation, then heating the dross to the fusion point of the more fusible metal to be recovered and passing a mechanical device downwardly substantially into the dross to break the adhesion between the unfused and fused material whereby to free the latter.

14. In apparatus for separating more fusible from less fusible material in dross, the combination comprising a substantially closed chamber into which such dross is introduced, means for heating the dross in said chamber to the fusion point of the more fusible material, a rotatable element, movable through the dross and adapted to break the adhesion between the unfused and fused material whereby to free the latter, and means for carrying off such freed fused material.

15. In apparatus for separating more fusible from less fusible material in dross, the combination comprising a substantially closed elongated chamber, means for heating dross in said chamber, a charging inlet at one end and a discharge outlet at the other end of said chamber, a longitudinal well in said chamber adapted to receive and accumulate fused-out material as a bath upon which the dross my float, a rotatable wiping and propelling element adapted to wipe fused material from particles of unfused material whereby to permit the fused material to accumulate in the well, said element being further adapted to urge the dross toward said outlet.

16. The method of recovering solder or other easily fusible metals from dross, which consists in forming a bath within an enclosure heated sufficiently to fuse a portion of the material in the dross to be treated, and adapted to substantially exclude atmosphere therefrom to minimize oxidation of the dross, continuously passing dross mechanically through said enclosure, the dross being floated upon said bath during such passage, and forcibly and mechanically breaking down the coatings of the dross particles during such passage to release the fused from the unfused materials.

17. The method of recovering solder or other easily fusible metals from dross, which consists in forming a bath within an enclosure heated sufficiently to fuse a portion of the dross to be treated, and adapted to substantially exclude atmosphere therefrom to minimize oxidation of the dross, continuously passing dross through said enclosure, the dross being floated upon said bath during such passage, mechanically breaking down the coatings of the dross particles to release fused metal therefrom and forcing portions of the dross downwardly into and through said bath whereby to assist the fused portions of said particles in uniting with the bath.

WILLIAM F. EPPENSTEINER.